United States Patent
Kolavennu et al.

(10) Patent No.: US 7,420,510 B2
(45) Date of Patent: Sep. 2, 2008

(54) LOCATION AND TRACKING OF PEOPLE WITH COMBINED USE OF RF INFRASTRUCTURE AND DEAD RECKONING MODULES

(75) Inventors: Soumitri N. Kolavennu, Minneapolis, MN (US); Steve D Huseth, Plymouth, MN (US)

(73) Assignee: Honeywell International Inc., Morristown, NJ (US)

( * ) Notice: Subject to any disclaimer, the term of this patent is extended or adjusted under 35 U.S.C. 154(b) by 99 days.

(21) Appl. No.: 11/405,934

(22) Filed: Apr. 17, 2006

(65) Prior Publication Data

US 2007/0241965 A1   Oct. 18, 2007

(51) Int. Cl.
   *G01S 5/06* (2006.01)
(52) U.S. Cl. ...................................................... 342/465
(58) Field of Classification Search .................. 342/465
   See application file for complete search history.

(56) References Cited

U.S. PATENT DOCUMENTS

| | | | | |
|---|---|---|---|---|
| 4,494,119 A * | 1/1985 | Wimbush | ...................... | 342/457 |
| 5,977,913 A * | 11/1999 | Christ | .......................... | 342/465 |
| 6,567,669 B1 * | 5/2003 | Groome | ................... | 455/456.6 |
| 7,236,128 B2 * | 6/2007 | Sugar et al. | .................. | 342/465 |
| 2002/0008625 A1 * | 1/2002 | Adams et al. | ............. | 340/573.1 |
| 2002/0183979 A1 * | 12/2002 | Wildman | ..................... | 702/188 |
| 2003/0043073 A1 * | 3/2003 | Gray et al. | ................... | 342/465 |
| 2005/0093745 A1 * | 5/2005 | Krumm et al. | .............. | 342/465 |

* cited by examiner

*Primary Examiner*—Gregory C Issing
(74) *Attorney, Agent, or Firm*—Kris T. Fredrick

(57) ABSTRACT

A system for tracking persons and other assets in a structure, having a multi-function tracking tag and a network of fixed RF receivers forming a gateway array. The location of the person being tracked is calculated by a computer using an algorithm that weights each separate signal according to the probability of its accuracy, thus using data with the least error. A preferred algorithm is shown in FIG. 2.

18 Claims, 5 Drawing Sheets

$$\min_{x_B, y_B} w_{rf} \sum_{i=1}^{n} w_i J_i^2 + w_{drm} J_{drm}$$

$$J_i = \sqrt{(X_i - X_B)^2 + (Y_i - Y_B)^2} - d_i$$

$$J_{drm} = (X_{drm} - X_B)^2 + (Y_{drm} - Y_B)^2$$

LOCATION AND TRACKING OF PEOPLE WITH COMBINED USE OF RF INFRASTRUCTURE AND DEAD RECKONING MODULES

FIELD OF THE INVENTION

The present invention relates to a tracking system. More particularly, the present invention relates to an improved algorithm for use with a dead-reckoning module in each mobile tag and a fixed beacon to locate the mobile tag, and person using it, even when a fixed position beacon has moved for some reason.

BACKGROUND OF THE INVENTION

First responders such as fire fighters, police officers, and search and rescue teams are subject to numerous dangers. A significant contributor to these dangers is the potential of being lost or disoriented within a building that is filled with smoke and collapsed structures.

Radio Frequency (RF) based tracking systems rely on a combination of fixed beacons and mobile tags to track the movement of the tags, based on signal strength or time-of-flight measurements of specific RF signals. Near-continuous RF links with the beacons are necessary for the system to calculate timely location information. However, RF propagation variability may result in loss of path data for a mobile tag or tags. An alternative approach, which overcomes the RF link variability issue, employs a dead-reckoning module (DRM) in each mobile tag. The DRM can contain multiple sensors, such as altimeters, barometers, accelerometers, temperature sensors, and compass sensors, for example. The RF link is then used solely for data communications between the mobile tags and the base stations.

However, determining the absolute location of each mobile tag would require a known frame of reference within which the mobile tags are used. The cost of such a frame of reference would be prohibitive, needing a high density of beacons for RF tag tracking or adding GPS capability to the DRM. Moreover, both the RF and the DRM approaches have error sources which exhibit cumulative effects such as multi-path in the RF tags and sensor drift.

Movement, or failure, of receivers may degrade the accuracy of the position location information. Specifically, the use of RF tracking systems to monitor persons, such as first responders, may encounter a catastrophic event such as a building collapse, leading to the effective re-location of one or more of the receivers. In this case the reported tag location will be corrupt due to the displacement of the receivers and subsequent apparent co-location of a tag near multiple receivers.

One of the problems with systems that calculate the location of an individual using a plurality of signals is that some signals may be less representative of the actual location than others. Prior art systems do use signal strength to determine location from multiple anchors.

It would be of advantage in the art if a system could be devised that would permit the use of an array of fixed beacon receivers that would maintain their utility even when moved due to outside influences such as damage to the place where the beacon receivers are fixed such that the calculations of signal strength could be weighted to favor those signals of maximum confidence.

Yet another advantage would be if a tracking tag could be developed that would allow integration of DRM data that is weighted to use signals that have maximum confidence factors.

Still another advantage would be if errors arising from multiple RF transmissions could be compensated for by weighting the respective signals.

Other advantages will appear hereinafter.

SUMMARY OF THE INVENTION

It has now been discovered that the above and other advantages of the present invention may be obtained in the following manner. Specifically, the present invention includes three basic components.

First, a beaconing sensor package is worn by an individual and a plurality of radio receivers are placed in an array in a specific area to be monitored, such as a building in which the individual has entered. A computer then integrates all the location information using an algorithm according to this invention, and then displays the relevant information on a user interface.

The algorithm of the present invention takes known data and solves for the unknown, that being the location of the individual first responder. This location is designated as $(X_B, Y_B)$ where X and Y are coordinates representing a location. A plurality of RF anchors have known locations designated as $(X_i, Y_i)$ where i=1 ... n. Signal strength of beacon's transmissions is represented by $S_i$ where i=1 ... n. The location of each DRM is designated as $X_{drm}$ $Y_{drm}$ and the distance to signal strength function is $d_i \cong f(s_i)$ is approximately known with some error bounds. The present invention minimizes the squared error between the Euclidean distance for $(X_B Y_B)$ and $(X_i Y_i)$ and the distance estimated from the distance to signal strength function in addition to the squared error between $(X_B Y_B)$ and the DRM location prediction.

BRIEF DESCRIPTION OF THE DRAWINGS

For a more complete understanding of the invention, reference is hereby made to the drawings, in which.

DETAILED DESCRIPTION OF THE PREFERRED EMBODIMENT

Figure 1:
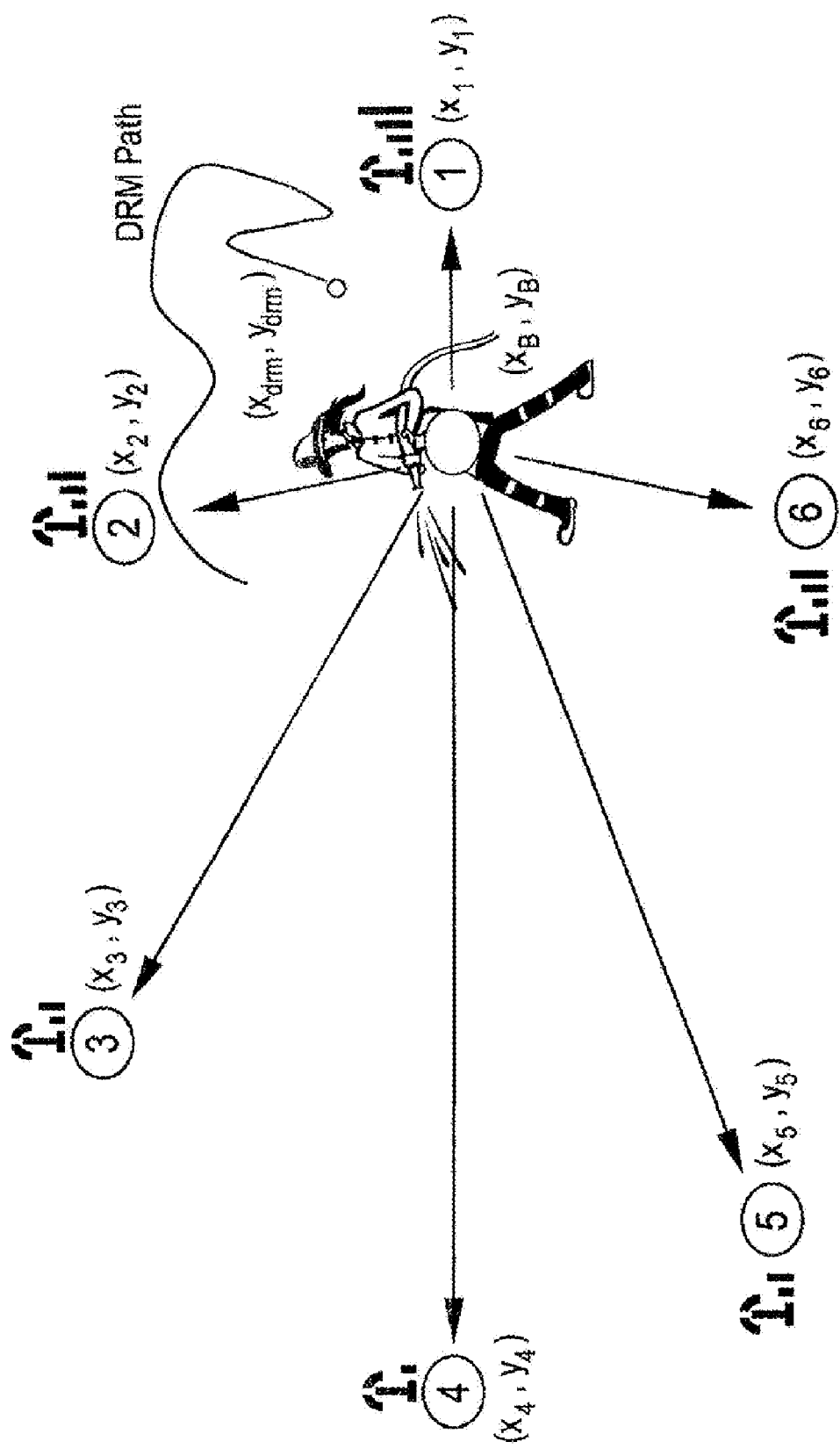
FIG. 1 is a schematic view of the present invention in which a person is inside an array of six beacon receivers.

The present invention provides for substantial improvements in a tracking system using an improved tag or module. As shown in FIG. 1, a first responder F is shown in an environment, such as inside a building. In this example, the first responder F is a firefighter engaged in a fire fighting operation in which he or she performs the appropriate work. In accordance with this invention, first responder F carries a beaconing sensor package that is in communication with an array of radio receivers 1, 2, 3, 4, 5 and 6, as shown in FIG. 1. The location of the first responder F is determined by processing the signals from the radio receivers 1-6 using the known coordinates of radio receivers 1-6 to locate the coordinates of the first responder F using the algorithm of this invention.

A more complete description of the environment of the first responder F in which the algorithm of the present invention may be used is described in a commonly owned U.S. patent application Ser. No. filed of even date herewith in the names of Philip J. Zumsteg and Steve D. Huseth entitled Multi-Function Tracking Tag With Robust Asset Tracking System, the disclosure of which is incorporated herein by reference in its entirety. In that system the first responder F carries a sending device that is received by a plurality of receivers that transmit that data to a monitor. This invention provides for a more accurate calculation of the location of the first responder F as set forth below.

The signal strength of the beacon of a particular radio receiver will be approximately proportional to the distance between the radio receiver and the beacon carried by the first responder F. By combining the signal strength of multiple radio receivers at known locations, such as receivers 1-6 in FIG. 1, the location of first responder F can be estimated. First responder F also carries a sensor package that includes sensors for determining building floor level, direction of travel, and rate of travel. An altimeter, magnetometer and accelerometer are provided to accomplish these measurements. This information can be combined with the signal strength information from all the receiving radio receivers and sent to a computer using an algorithm to produce an estimated location of first responder F. When a first responder becomes lost or disabled, the command center will be able to quickly identify where the first responder F is located and send a rescue team or instruct first responder F how to move to a safe area.

One DRM is disclosed in U.S. Pat. No. 5,583,776 to Levi et al., the disclosure of which is incorporated herein by reference in its entirety. This DRM is a microcomputer-assisted position finding device that integrates GPS data, dead reckoning sensors and digital maps and has a built-in RF transponder. The Levi et al. DRM provides ground speed/distance measurements and computer-aided position fixes. One such DRM device is available from Point Research Corporation, of Santa Ana Calif. as the product Dead Reckoning Module (DRM)®. The Dead Reckoning Module is a miniature, self-contained, electronic navigation unit that provides the user's position relative to an initialization point. The device includes a built in GPS receiver. A microprocessor performs dead reckoning calculations and includes a Kalman filter to combine the dead reckoning data with GPS data. The Kalman filter and other proprietary algorithms use GPS data to calibrate dead reckoning sensors for typical dead reckoning accuracy of 2 to 5 percent of distance traveled from the last position fix, entirely without GPS. The evaluation kit includes test software and is supplied in a housing with belt clip, re-chargeable Li-Ion battery, and charger. These devices are intended for use by personnel on foot, and are not for use on vehicles.

At the command center or operations center, the signals from all the radio receivers 1-6 are fused using the algorithm of the present invention that employs a weighted multilateration technique to derive a new estimated position. The weighted multilateration algorithm has two significant innovations. Each term in the algorithm is weighted by the relative signal strength such that receivers receiving higher signal strength have greater weight than those receivers receiving lower signal strength. The purpose of this weighting based on signal strength because low signal strength signals have greater variability and error. Also, a weight is applied to the estimated positions produced by the sensors based upon the expected confidence. The location determined by the sensors tend to drift over time and when the motion of the first responder becomes irregular, such as while climbing over obstacles, crawling, or jumping. Such irregularities are discernable from the sensor information and are used to reduce the weight of the sendor based estimated position in the location calculations.

The algorithm of the present invention takes known data and solves for the unknown, that being the location of the individual first responder F. This location is designated as $(X_B, Y_B)$ where X and Y are coordinates representing a location. A plurality of RF Anchors have known locations designated as $(X_i, Y_i)$ where i=1 ... n. Signal strength of beacons Tx is represented by $S_i$ where i=1 ... n. The location of each DRM is designated as $X_{drm}$ $Y_{drm}$ and the distance to signal strength map is $d_i \cong f(s_i)$. FIG. 1 illustrates six RF Anchors, 1-6, having known coordinates $X_{1-6}$, $Y_{1-6}$ as examples.

The present invention minimizes the squared error between the Euclidean distance and distance estimate and the error in DRM prediction. $W_{rf}$ and $W_{drm}$ are the relative weights between the RF prediction and the DRM prediction. It is known that $W_{drm}$ is time varying and decreases as the DRM error drifts. $W_i$ is a weighting factor proportional to $S_i$ because $d_i$ is more accurate for high values of $s_i$.

Figures 2, 3:
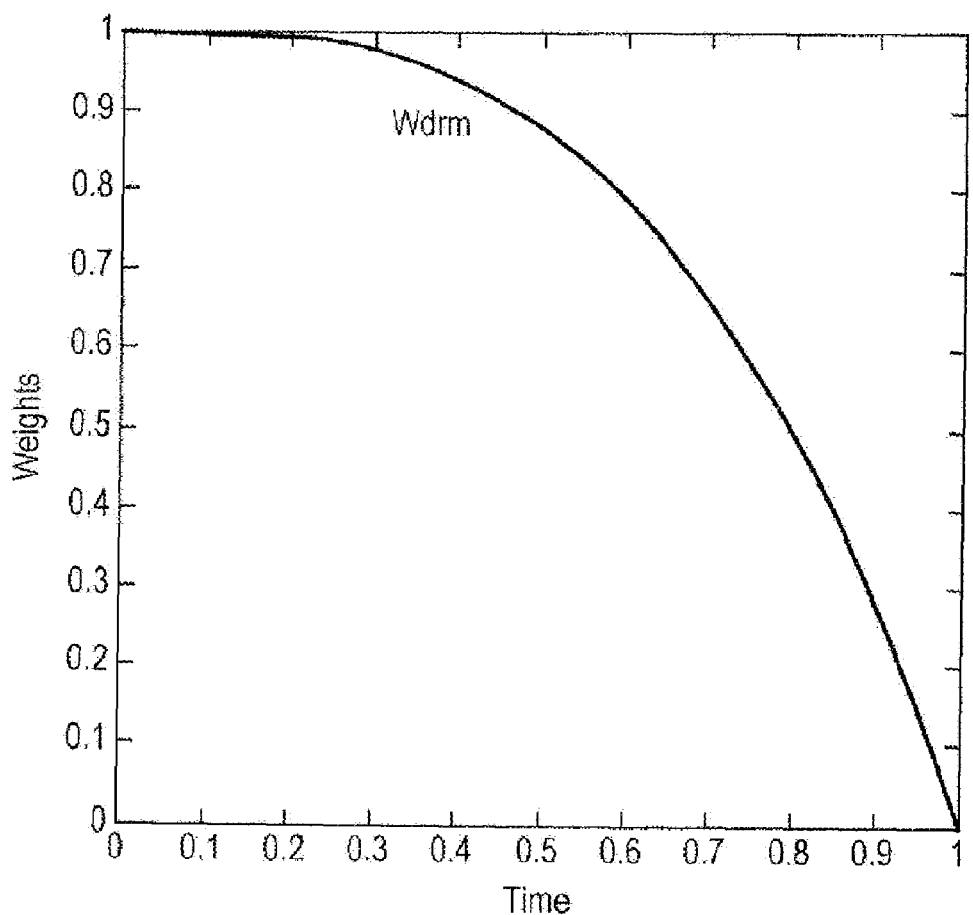
FIG. 2 is an equation of the preferred algorithm of the present invention.
FIG. 3 illustrates a graph depicting the degradation of weights of DRM predictions.

$X_B, Y_B$ is found by solving the optimization problem which is shown in the drawings as FIG. 2, and in which the sum of the error value J based on signal strength is calculated to be the square root of the squares of the differences between values for all fixed X and Y coordinates and the coordinates of the responder. Both RF and DRM signals are calculated and used in this equation:

Min $(X_B,Y_B)$ $W_{rf=1}\Sigma^n w_i J^2_i + w_{drm} J_{drm}$ where $J_i$ and $J_{drm}$ are defined above and in FIG. 2.

Figure 4:
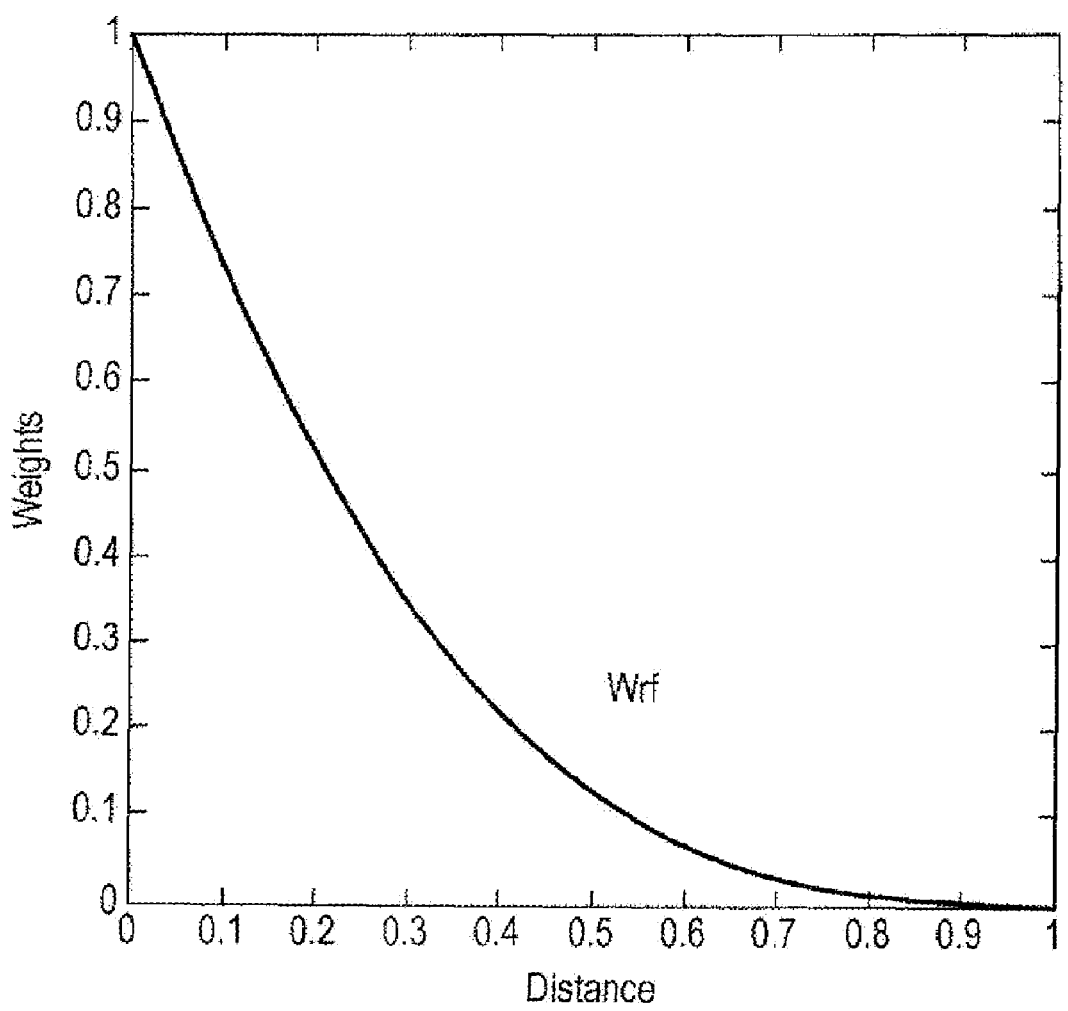
FIG. 4 illustrates a graph depicting the degradation of weights if RF predictions.

FIGS. 3 and 4 illustrate the relative weights $w_{drm}$ used in the algorithm as time progresses. In FIG. 3, the weight given to the DRM data decreases with time. In FIG. 4, the weight given to the RF data decreases over distance. In both cases, each RF signal increases with increased signal strength and provides the weights for use in FIG. 2.

Solving the algorithm by a computer produces a much improved and more accurate representation of the location of the first responder F. That location is constantly updated as the receivers continue to send data to the computer, until the first responder F has reached a safe location or been found.

The number of RF anchors will be determined by the size of the facility, the expected danger for first responders and by other factors. The RF anchors can be located in the facility, and others may be positioned on mobile or stationary platforms outside the facility, including one or more on the command vehicle, if one is used.

The first responder is shown in this description as a firefighter as an example of a person who might use the present invention, but any person in any environment where position and safety is monitored at a remote location is part of this invention. Other persons by way of example and not as a limitation are police, military, national guard, EMT personnel and other medically trained persons, and the like are intended users of the present invention.

Figure 5:
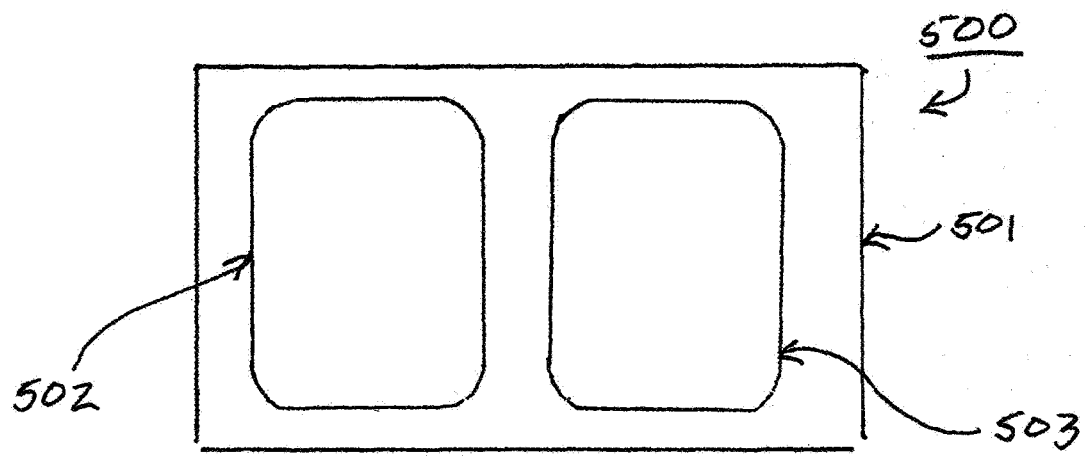
FIG. 5 illustrates a schematic view of a multi-function tracking tag that can be implemented in accordance with a preferred embodiment.

FIG. 5 illustrates a multi-function tracking tag system 500 of the present invention. The system includes the multi-function tracking tag 501 which comprises an RF beacon 502 portion for transmitting a beacon signal to be received by radio receivers 1-6 of FIG. 1. Multi-function tracking tag 501 also includes a dead reckoning module (DRM) 503.

Figure 6:
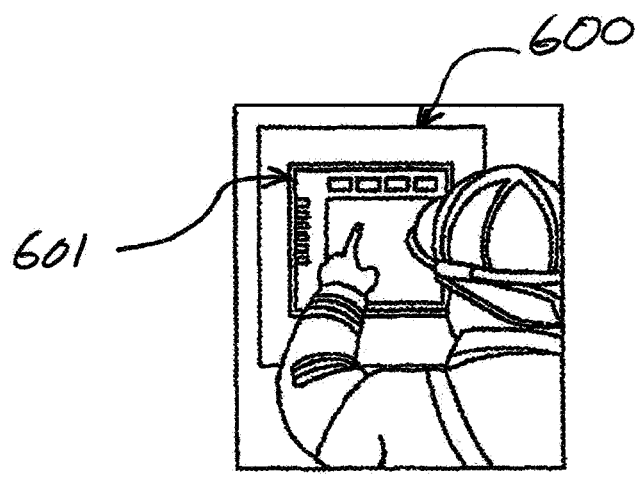
FIG. 6 illustrates a view of a data processing system that can be adapted for use in accordance with a preferred embodiment.

FIG. 6 illustrates a computer data processing system 600 utilized in the present invention. Computer data processing system 600 solves the algorithm of FIG. 2 to produce an estimate location of first responder F. Computer data processing system 600 includes display unit 601 to display the estimated location of first responder F.

Figure 7:
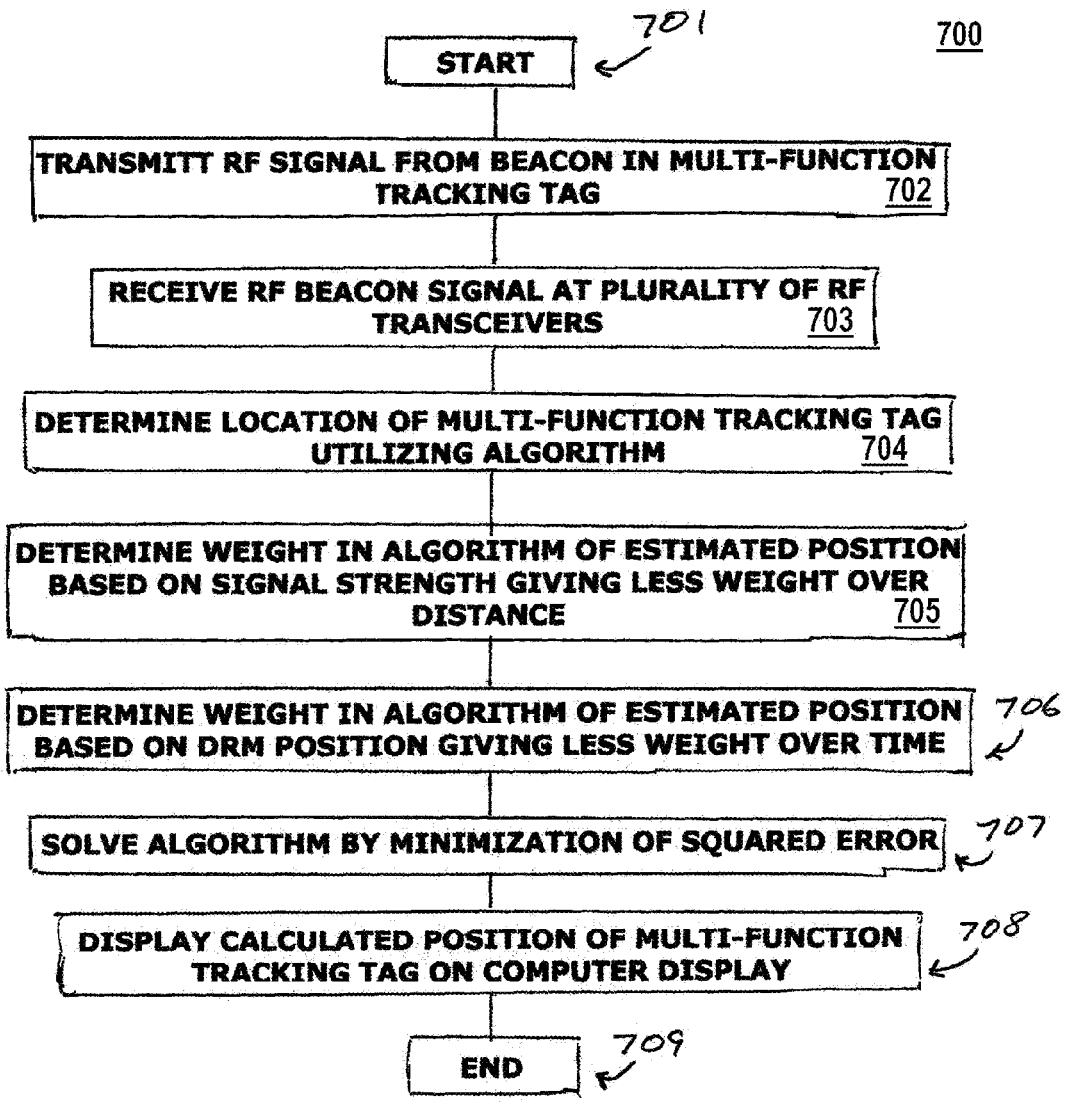
FIG. 7 illustrates a high-level flowchart of logical operations that can be implemented in accordance with a preferred embodiment.

FIG. 7 illustrates a flowchart 700 of operational steps of the present invention. As illustrated at block 701, the method starts. Block 702 illustrates that an RF signal is transmitted from a beacon in the multi-function tracking tag 501. The RF signal is received at a plurality of RF transceivers as shown at block 703. The location of the multi-function tracking tag 501 is determined at block 704 utilizing an algorithm. Block 705 illustrates that weight in the algorithm is given to an estimated position based on the signal strength of the received beacon signal. Less weight is given to the estimated signal strength position over distance. Block 706 illustrates that weight in the algorithm is given to an estimated position based on the DRM position. As shown in block 706, less weight is given to the estimated DRM position over time. Block 707 illustrates that the algorithm is thereby solved by minimizing the squared error and the estimated position of first responder F thereby calculated is displayed, as illustrated at block 708. The method concludes, as illustrated at block 709.

While particular embodiments of the present invention have been illustrated and described, it is not intended to limit the invention, except as defined by the following claims.

The invention claimed is:

1. A system for tracking persons and other assets in a structure, comprising:
a multi-function tracking tag comprising an RF beacon for transmitting an RF beacon signal and a dead reckoning module, said RF beacon signal including data from said dead reckoning module;
a plurality of RF transceivers of known location forming a wireless array for receiving said RF beacon signal from said multi-function tracking tag and thereafter re-transmitting said RF beacon signal; and
a computer associated with said plurality of RF transceivers, said computer being programmed to determine a location of said multi-function tracking tag using an algorithm wherein said algorithm utilizes signal strength of said RF beacon signal and said data from said dead reckoning module to calculate said location of said multi-function tracking tag wherein said algorithm minimizes a squared error between a position estimate based on said signal strength of said RF beacon signal and a position estimate based on said data from said dead reckoning module.

2. The system of claim 1, which includes a plurality of multi-function tracking tags.

3. The system of claim 1, wherein said position estimate based on said signal strength is given less weight in said algorithm as said signal strength decreases.

4. The system of claim 1, wherein said dead reckoning module comprises an altimeter, a magnetometer and an accelerometer.

5. The system of claim 4, wherein said dead reckoning module combines readings from said altimeter, said magnetometer and said accelerometer with an initial starting position to produce a new estimated position.

6. The system of claim 3, wherein said position estimate based on said data from said dead reckoning module is given less weight in said algorithm as time increases.

7. The system of claim 1, wherein said data from said dead reckoning module comprises a dead reckoning position estimate of said multi-function tracking tag.

8. The system of claim 1, wherein said computer displays said location of said multi-function tracking tag on a user display.

9. A method comprising the steps of:
transmitting an RF beacon signal from a multi-function tracking tag comprising an RF beacon and a dead reckoning module, said RF beacon signal including estimated position data from said dead reckoning module;
receiving said RF beacon signal at a plurality of RF transceivers of known location within a structure forming a wireless array; and
determining a location of said multi-function tracking tag using an algorithm programmed on a computer associated with said plurality of RF transceivers, wherein said algorithm utilizes signal strength of said RF beacon signal and said estimated position data from said dead reckoning module to calculate said location of said multi-function tracking tag wherein said algorithm minimizes a squared error between a position estimate based on said signal strength of said RF beacon and a position estimate based on said estimated position data from said dead reckoning module.

10. The method of claim 9 further comprising:
displaying said location of said multi-function tracking tag on a user display of said computer.

11. The method of claim 9 further comprising:
weighing said position estimate based on said signal strength less over distance from said RF transceivers in said algorithm.

12. The method of claim 11 further comprising:
weighing said position estimate based on said position data from said dead reckoning module less over time.

13. The method of claim 12 wherein said position data from said dead reckoning module comprises a dead reckoning position estimate of said multi-function tracking tag.

14. A system comprising:
a multi-function tracking tag comprising an RF beacon for transmitting an RF beacon signal and a dead reckoning module, wherein said RF beacon signal includes estimated position data from said dead reckoning module;
a plurality of RF transceivers forming a wireless array within a structure to receive said RF beacon signal; and
a computer associated with said plurality of RF transceivers, said computer being programmed to determine a location of said multi-function tracking tag using an algorithm wherein said algorithm utilizes signal strength of said RF beacon signal and said estimated position data from said dead reckoning module to calculate said location of said multi-function tracking tag by minimizing a squared error between a position estimate based on said signal strength of said RF beacon and a position estimate based on said position data from said dead reckoning module to thereby implement a system for tracking persons and other assets in a structure.

15. The system of claim 14, wherein said position estimate based on said signal strength is given less weight in said algorithm as said signal strength decreases.

16. The system of claim 14, wherein said position estimate based on said position data from said dead reckoning module is given less weight in said algorithm as time increases.

17. The system of claim 14 further comprising:
a user display on said computer to display said location of said multi-function tracking tag.

18. The system of claim 14 further comprising:
a plurality of additional RF transceivers disposed outside of said structure.

* * * * *